S. A. BAKER.
CAN SOLDERING MACHINE.
APPLICATION FILED APR. 29, 1901.
907,116.
Patented Dec. 22, 1908.
3 SHEETS—SHEET 1.
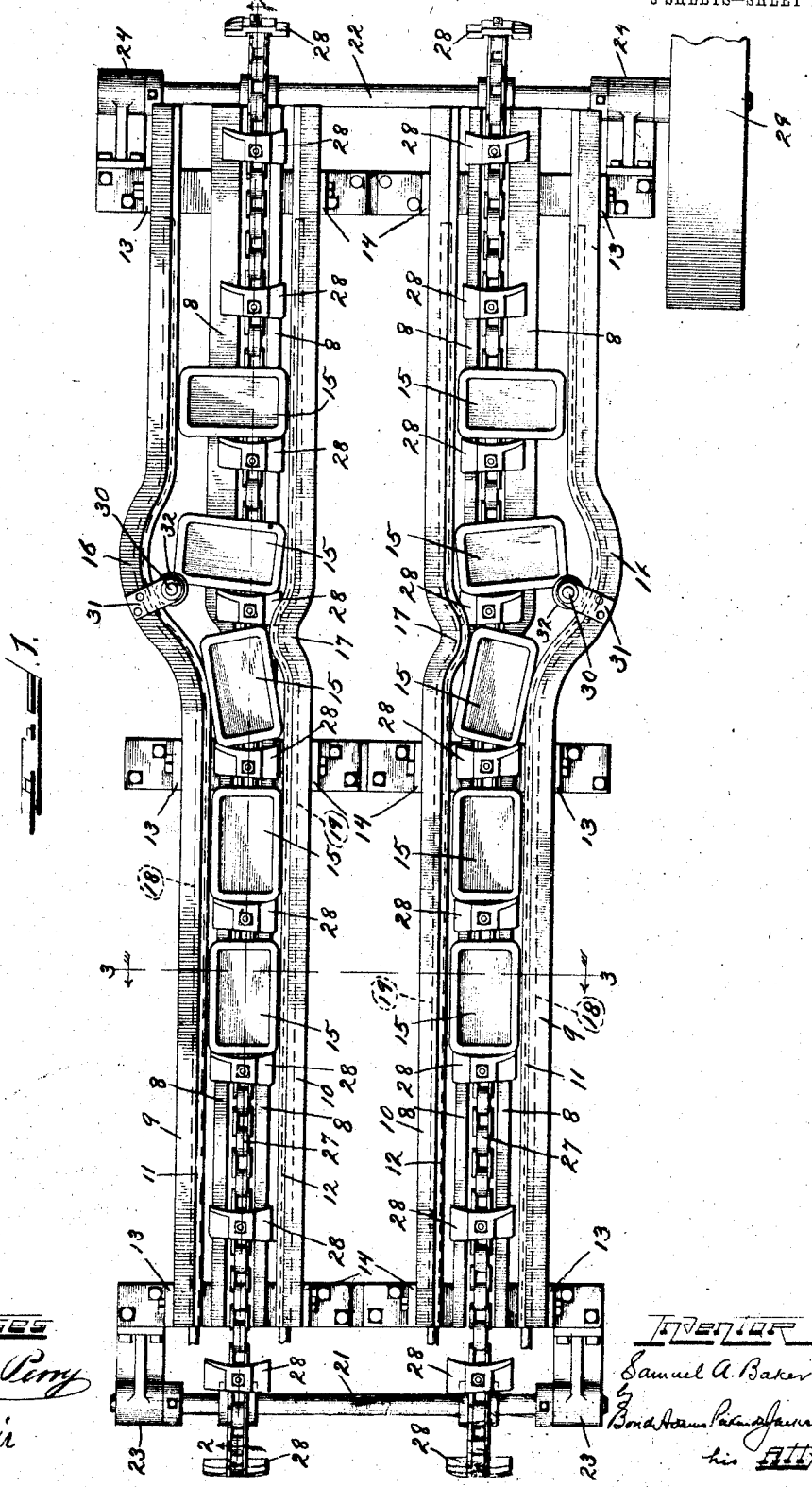

S. A. BAKER.
CAN SOLDERING MACHINE.
APPLICATION FILED APR. 29, 1901.
No. 907,116.
Patented Dec. 22, 1908.
3 SHEETS—SHEET 2.
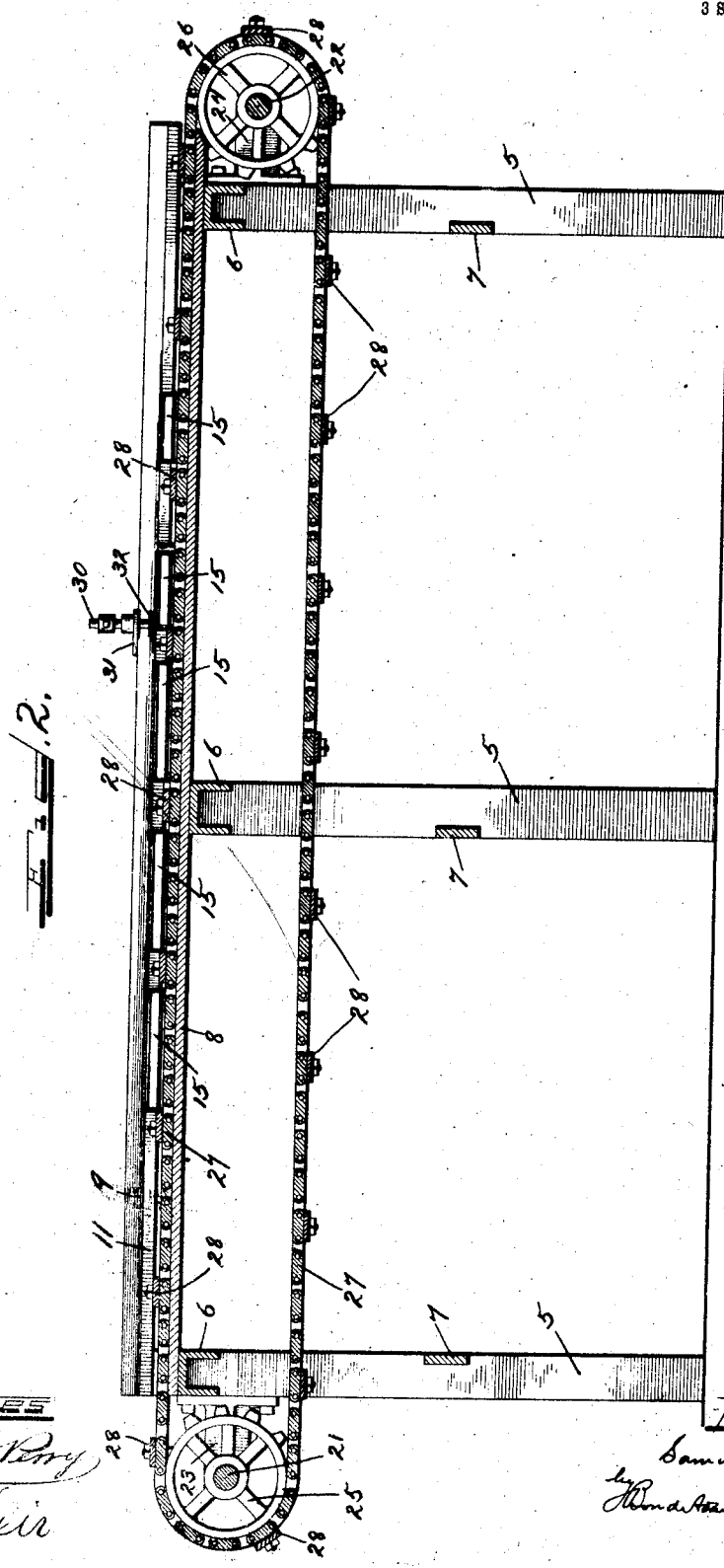

S. A. BAKER.
CAN SOLDERING MACHINE.
APPLICATION FILED APR. 29, 1901.
No. 907,116.
Patented Dec. 22, 1908.
3 SHEETS—SHEET 3.
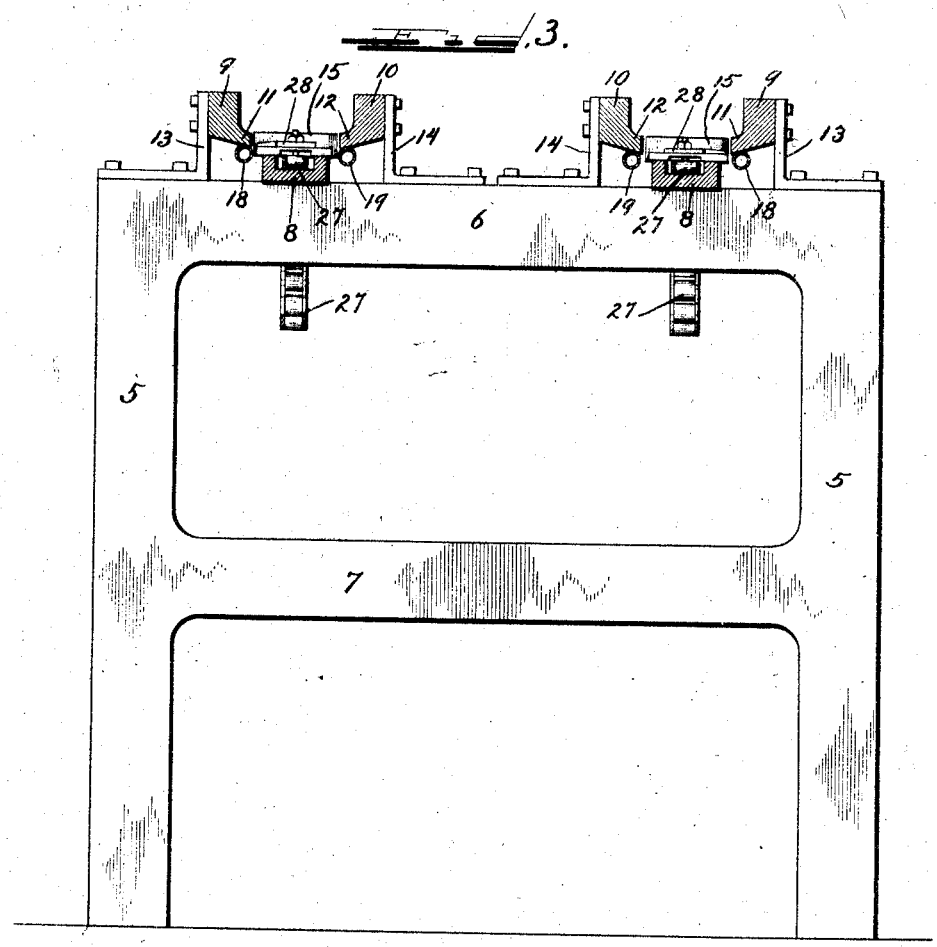
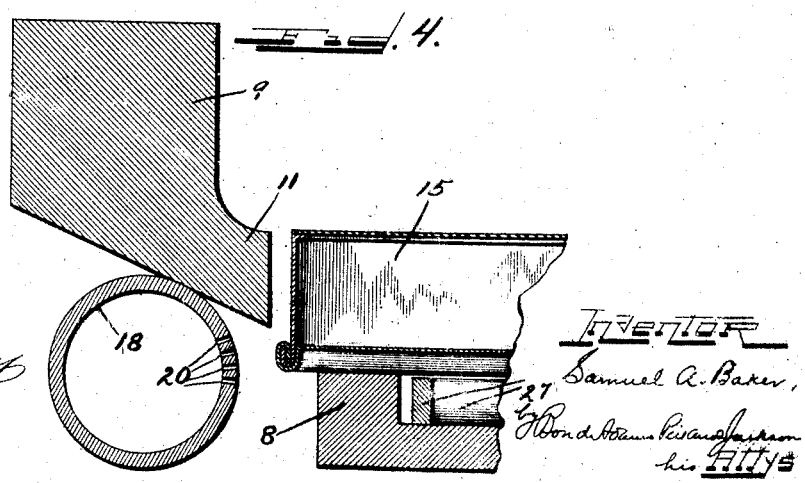

UNITED STATES PATENT OFFICE.

SAMUEL A. BAKER, OF EASTPORT, MAINE, ASSIGNOR, BY MESNE ASSIGNMENTS, TO AMERICAN KEY CAN COMPANY, OF CHICAGO, ILLINOIS, A CORPORATION OF NEW JERSEY.

CAN-SOLDERING MACHINE.

No. 907,116.   Specification of Letters Patent.   Patented Dec. 22, 1908.

Application filed April 29, 1901. Serial No. 57,992.

*To all whom it may concern:*

Be it known that I, SAMUEL A. BAKER, a citizen of the United States, residing at Eastport, in the county of Washington and State of Maine, have invented certain new and useful Improvements in Can-Soldering Machines, of which the following is a specification, reference being had to the accompanying drawings.

My invention relates to machines for soldering cans previously prepared in the manner set forth in my application for Letters Patent of the United States, Serial Number 25,886, filed August 4, 1900, or otherwise prepared, so that the soldering operation may be completed by the simple application of heat. In general, it may be stated that such operation consists in applying solder to one or both parts to be joined and bringing the parts of the seam together after the solder has cooled, so that the said parts lie closely in contact after being united, the solder previously applied being in position to unite the seams as soon as it is heated sufficiently to melt it.

My present invention has special reference to the soldering of cans, or other articles, of such form that in the process of heating or "sweating" the cans to melt the solder, it is necessary to change the position of the cans, as by wholly or partially rotating them about a more or less perpendicular axis; and it has for its object to provide an improved machine by which cans, previously prepared as above described, may be heated or sweated and rotated, as necessary, to secure the application of heat to all parts of the seam.

In the drawings I have illustrated the application of my invention to the soldering of the bottoms of sardine cans, the edges of the bottom and can-body being rolled together after one of them has received a coating of solder. I wish it to be understood, however, that my invention is not restricted, in its application, to such cans, as it may be used for any other purpose to which it is adapted.

In the accompanying drawings,—Figure 1 is a plan view, showing a machine embodying my invention; Fig. 2 is a longitudinal section on line 2—2 of Fig. 1; Fig. 3 is a cross-section on line 3—3 of Fig. 1; and Fig. 4 is an enlarged detail, being a partial cross-section illustrating the operation of the machine.

Referring to the drawings,—5 indicates a series of standards, connected by upper cross-bars 6, lower cross-bars 7 and longitudinal bars 8, forming the frame of the machine. The longitudinal bars, as shown in Fig. 3, are channel bars, the channel being on the upper side. In the drawings I have shown a double machine, there being duplicate parts throughout; but it will be understood that any desired number of channel bars 8, and the parts associated therewith, may be employed. At opposite sides of each channel bar 8 are guides 9—10, arranged parallel with each other throughout the greater part of their length and having inwardly-projecting edges 11—12, respectively, which lie in proximity to and somewhat above the upper edges of the channel bar 8. The guides 9—10 are supported by brackets 13—14, respectively, which are secured to the cross-bars 6, as shown in Fig. 3.

Referring to Fig. 1, it will be seen that for a portion of their length the guides 9—10 are set far enough apart so that their edges 11—12 are separated by slightly more than the width of the cans 15. For the latter part of their length said guides are separated by a space slightly greater than the length of the cans. By this construction, the edges 11—12 of the guides act to keep the cans properly in position as they are moved through the machine. As shown in Fig. 1, the guide 9 is deflected outwardly, as shown at 16. The guide 10 is deflected inwardly, as shown at 17 in Fig. 1, at a point nearly opposite the deflected portion of the guide 9. The deflected portion 17 is placed so as to be engaged by the cans before they reach the portion 16 of the guide 9, as shown.

18—19 indicate gas-burners, arranged, respectively, under the edges 11—12 and having perforations 20 on their inner portions, as shown in Fig. 4. The burners 18—19 extend longitudinally of the machines, as shown by dotted lines in Fig. 1, and lie under the straight portions of the guides, so that the side or end seams of the cans, as the case may be, are subjected to the flame of said burners.

21—22 indicate shafts placed at the inlet and outlet ends of the machine, said shafts being mounted in suitable bearings 23—24, respectively, secured to the standards 5. In the construction shown, each of said shafts carries two sprocket-wheels; the sprocket-wheels at the inlet end of the machine being marked 25, and those at the outlet end, 26.

27 indicates endless chains, one of which is mounted on each pair of sprocket-wheels 25—26; the upper portions of said chains being adapted to run in the channel of the channel bar 8, as shown. Said chains carry blocks 28, the blocks being adapted to engage the cans and carry them along between the guides 9—10. The forward faces of said guide-blocks are concave, to facilitate the rotation of the cans on their axes at the proper time.

29 indicates a pulley mounted on the shaft 22, for rotating said shaft and driving the chains 27. In operation the chains are caused to move in the direction shown by the arrow in Fig. 1, so that the cans are carried from the inlet end to the outlet end of the machine.

30 indicates a guide-pin, carried in a bracket 31 secured to the guide 9 opposite the deflected portion 16 thereof, said pin having at its lower end a beveled head 32, which is adapted to lie over and engage the outer edges of the cans as their position is shifted between the guides, thereby preventing them from becoming displaced.

The operation of my improved machine is as follows: The cans are placed on the chain or carrier at the inlet end of the machine, one can being placed in advance of each of the blocks 28, resting on the upper edges of the channel-bar 8. At this time, the cans move endwise. As they pass along between the guides 9—10 they are subjected to the heat of the burners 18—19, which is then directed against the side seams of the cans, thereby melting the solder contained in the same and uniting the parts. When the can arrives at the deflected portion 17 of the guides 10, its forward end is deflected outward, such deflection continuing as the can is moved along, until the can turns through an arc of ninety degrees, when it moves along sidewise between the ends of the guides 9—10, nearer the outlet end of the machine. During the turning operation the outer rear corner of the can moves inward across the concave faces of the block 28, against which it rests; and as soon as the outer forward corner is deflected sufficiently, it engages the head 32 of the guide-pin 30, passing partially under it, as shown in Fig. 1. By this means, the can is prevented from getting out of position during the turning operation, which is effected gradually, thereby minimizing the danger of displacement. When the can is moved sidewise its ends are subjected to the heat of the burners, thereby melting the solder and completing the soldering operation. While subjected to the heat of the burners, the major portion of the body of the can is protected from the heat to a great extent by the edges 11 or 12 of the guides 9—10, respectively, as shown in Fig. 4. The lower surface of the can is also protected by the sides of the channel-bar, on which it rests, as also shown in Fig. 4. When the can arrives at the outlet end of the machine, it may either be deposited in a receptacle placed to receive it, or be removed by hand, as may be desired.

It will be observed that the cans are conducted through the machine on a level bottom, the side and end edges of the cans being each subjected to the heat of the burners, so that the solder is melted and the cans thereby soldered. The advantage of carrying the cans through on a level—i. e., with their bottoms in substantially a horizontal plane—is that the solder is kept from running when melted, as it would be apt to do if the cans were tilted to any considerable extent. It will also be observed that the guides by which the cans are turned upon the support are deflected relatively to the support as well as to the carrier,—said support and carrier extending in a substantially straight line from end to end of the machine. As shown in Fig. 1, one of the channel-bars 8 is wider at one end than at the other to provide a more extended support for the cans when turned transversely to the line of movement of the carrier, but the channel-bars together furnish a straight support for the cans.

I have described my invention specifically; but I wish it to be understood that it is not restricted to the specific details of the construction described, except in so far as such details are particularly claimed.

That which I claim as my invention and desire to secure by Letters Patent is,—

1. A machine for soldering cans, comprising means for supporting the cans on a substantially level bottom as they move through the machine, a carrier for moving the cans along on said supporting-means, and guides at opposite sides of said carrier and deflected laterally relatively thereto, said guides being adapted to engage the cans and turn them about a vertical axis on said supporting-means.

2. A machine for soldering cans, comprising supporting bars spaced apart on which the cans are adapted to rest, a carrier mounted between said bars and adapted to engage the cans and move them along on said bars, guiding-means deflected laterally relatively to the carrier for turning the cans upon said bars, and means adjacent to said guiding-means arranged to project over a portion of the cans and prevent displacement thereof.

3. In a can-soldering machine, the combination of a carrier, and guides between which the cans are moved by the carrier, said guides being laterally deflected relatively to the carrier in the same direction for turning the cans on the carrier and being spaced further apart at one side of the deflected portion thereof than at the other.

4. In a can-soldering machine, the combination of a carrier, guides between which the cans are moved by the carrier, said guides being laterally deflected relatively to the carrier in the same direction for turning the cans on the carrier, blocks carried by the carrier and adapted to engage the cans, the forward surfaces of said blocks being concave, and supporting-means on which the cans rest while moved along by said carrier.

5. In a can-soldering machine, the combination of a stationary can-support upon which the cans are adapted to move, guides at the sides thereof, said guides being laterally deflected in the same direction between their ends for turning the cans on said support, means for moving said cans along on said support between said guides, and gas-jets at the sides of said support for applying heat directly to the seams of the cans, substantially as described.

6. In a can-soldering machine, the combination of a stationary can-support upon which the cans are adapted to move, guides at the sides thereof, said guides being laterally deflected in the same direction between their ends for turning the cans on said support, means for moving said cans along on said support between said guides, gas-jets at the sides of said support for applying heat directly to the seams of the cans, and means for protecting the major portion of the bodies of the cans from heat, substantially as described.

7. In a can-soldering machine, the combination of a carrier consisting of an endless belt, blocks carried thereby, the forward surfaces of said blocks being concave, and guiding-means deflected laterally relatively to the carrier for changing the position of the cans.

8. In a can-soldering machine, the combination of a channel-bar, guides at the sides thereof, the edges of said channel-bar and guides being arranged to protect the major portions of the sides and lower surface of the cans from heat applied to the edges thereof, means for moving the cans along upon said channel-bar, means for applying heat directly to the edges of the cans, and means for turning the cans upon said channel-bar about a vertical axis through an arc of ninety degrees.

9. A machine for soldering cans, comprising means for supporting the cans on a substantially level bottom, a carrier for moving the cans on said supporting-means, guides for rotating said cans about a vertical axis, burners for applying heat to the seam to be soldered while the can is on said support, and means for protecting the major portion of the body of the can from excessive heat.

10. A machine for soldering cans, comprising means for supporting the cans on a substantially level bottom, a carrier for moving the cans on said supporting-means, burners for applying heat to the seam to be soldered while the can is on said support, means for turning the cans upon said support and means engaging with said cans for holding them upon the support during the turning movement.

11. A machine for soldering cans, comprising means for supporting the cans on a substantially level bottom, a carrier for moving the cans on said supporting-means, burners for applying heat to the seam to be soldered while the can is on said support, means for turning the cans about a vertical axis upon said support and means engaging with the tops of the cans to hold them on the support during the turning movement.

12. A machine for soldering cans, comprising means for supporting the cans to be soldered, a carrier for moving the cans along on said supporting-means, guiding means deflected laterally with reference to said supporting-means for turning the cans thereupon and means engaging with the tops of the cans to hold them on the support during the turning movement.

13. A machine for soldering cans, comprising means for supporting the cans to be soldered, a carrier for moving the cans along on said supporting-means, guiding means at opposite sides of the carrier deflected laterally with reference to said supporting-means for turning the cans upon said supporting-means and means engaging with said cans for holding them upon the support during the turning movement.

14. A machine for soldering cans, comprising supporting bars spaced apart on which the cans are adapted to rest, a carrier mounted between said bars and adapted to engage the cans and move them along on said bars, guiding-means deflected laterally relatively to said bars for turning the cans thereupon and means engaging with the tops of the cans to hold them on the support during the turning movement.

15. A machine for soldering cans, comprising supporting bars spaced apart on which the cans are adapted to rest, a carrier mounted between said bars and adapted to engage the cans and move them along on said bars, and guides at opposite sides of the carrier and deflected laterally relatively to said bars in the same direction but to different extents for turning the cans thereupon.

16. In a can-soldering machine, the combination of supporting means, a carrier, and guides between which the cans are moved by the carrier, said guides being laterally deflected relatively to said supporting means in the same direction but to unequal extents for turning the cans thereupon.

17. In a can-soldering machine, the combination of a carrier, supporting means on which the cans rest while being moved along by said carrier, guides between which the cans are moved by the carrier, said guides being laterally deflected relatively to said supporting means in the same direction but to unequal extents for turning the cans thereupon, and blocks carried by the carrier and adapted to engage the cans.

SAMUEL A. BAKER.

Witnesses:
JOHN L. JACKSON,
ALBERT H. ADAMS.